(12) United States Patent
Farmer (10) Patent No.: US 8,763,817 B1
(45) Date of Patent: Jul. 1, 2014

(54) MOTORCYCLE STAND WITH LOCKING MECHANISM

(71) Applicant: Austin Taylor Farmer, Brandon, FL (US)

(72) Inventor: Austin Taylor Farmer, Brandon, FL (US)

( * ) Notice: Subject to any disclaimer, the term of this patent is extended or adjusted under 35 U.S.C. 154(b) by 4 days.

(21) Appl. No.: 13/956,970

(22) Filed: Aug. 1, 2013

(51) Int. Cl.
*E05B 73/00* (2006.01)
*B62H 3/02* (2006.01)

(52) U.S. Cl.
CPC ........................................ *B62H 3/02* (2013.01)
USPC ................................................. 211/5; 211/17

(58) Field of Classification Search
USPC ............ 211/5, 17–22; 70/227, 226, 233, 234, 70/62; 248/551, 552, 553
See application file for complete search history.

(56) References Cited

U.S. PATENT DOCUMENTS

| | | | |
|---|---|---|---|
| 3,734,272 A * | 5/1973 | Galen | 206/335 |
| 3,865,244 A * | 2/1975 | Galen et al. | 211/5 |
| 4,182,454 A | 1/1980 | Tohms | |
| 5,301,817 A | 4/1994 | Merritt | |
| 5,373,146 A | 12/1994 | Lei | |
| 6,484,544 B1 * | 11/2002 | Wing | 70/227 |
| 6,539,759 B2 * | 4/2003 | Pershall | 70/234 |
| 8,410,899 B2 | 4/2013 | Stevenson et al. | |
| 2013/0043973 A1 | 2/2013 | Greisen et al. | |

FOREIGN PATENT DOCUMENTS

EP 2189361 A1 5/2010

* cited by examiner

*Primary Examiner* — Korie H Chan
(74) *Attorney, Agent, or Firm* — Andriy Lytvyn; Smith & Hopen, P.A.

(57) ABSTRACT

A stand for securing a parked motorcycle or a motorized scooter. The stand includes a housing within which a shaft is rotationally disposed. The shaft is capable of vertical translation along its longitudinal axis within the housing. A securing arm extends from the shaft. The securing arm transitions between an unlocked and locked positions by rotating about a center axis of the shaft and lowering vertically until an arch within the securing arm surmounts the parked vehicle. A locking mechanism is housed within the housing. The locking mechanism engages the shaft to retain the securing arm in its locked position. The locking mechanism disengages the shaft upon receipt of a correct authentication.

17 Claims, 6 Drawing Sheets

MOTORCYCLE STAND WITH LOCKING MECHANISM

BACKGROUND OF THE INVENTION

1. Field of the Invention

This invention relates to motorcycle stands. More specifically, it relates to a lockable motorcycle security stand for theft prevention.

2. Brief Description of the Related Art

Motorcycle theft is a rampant problem in the United States and worldwide. Motorcycles are fairly light and can be loaded onto a transport vehicle without any specialized machinery, making them an attractive target for thieves. Due to this problem, many motorcycle owners are reluctant to park their motorcycles in public places that do not provide anti-theft options for their vehicles. Consequentially, this issue may constitute a significant inconvenience for the motorcyclists and have a negative effect on businesses whose parking lots are devoid of motorcycle anti-theft measures.

Although a number of prior art devices attempted to resolve this problem, they all have significant shortcomings undermining their effectiveness. For example, the anti-theft device of European patent application publication No. EP 2,189,361 discloses a device that attaches to a brake disk of a wheel and is adapted to disable unauthorized starting of the engine. This device, however, is of little use against thieves who simply pick up the motorcycle and load it onto a transport vehicle without attempting to start the engine.

Another motorcycle anti-theft device was disclosed in U.S. Pat. No. 5,301,817. This device is a security stand for motorcycles adapted to secure front wheel of the motorcycle to the stand. A major shortcoming of such device is that a thief may detach the front wheel leaving it locked to the stand, and steal the body of the motorcycle.

U.S. Pat. No. 4,182,454 discloses a security stand for motorcycles that relies on a plurality of horizontal bars that must be fully removed and reinserted every time the motorcycle is being locked or unlocked. This tedious task may be too impractical for many users, especially when the motorcycle is being parked for a short period of time.

Accordingly, there exists a strong need for a motorcycle anti-theft stand that is both effective and easy to operate. However, in view of the art considered as a whole at the time the present invention was made, it was not obvious to those of ordinary skill in the field of this invention how the shortcomings of the prior art could be overcome.

BRIEF SUMMARY OF THE INVENTION

The long-standing but heretofore unfulfilled need for a motorcycle stand with a locking mechanism that is both effective and user-friendly is now met by a new, useful, and non-obvious invention.

The novel structure includes a stand for securing motorcycles and motorized scooters having a housing and a shaft rotationally disposed within the housing. The shaft is configured to translate vertically along its longitudinal axis. A securing arm extends from the shaft—the arm is configured to transition between a locked and an unlocked positions. The arm has an arch adapted to surmount a body of a motorcycle or a scooter when the arm is in the locked position. A locking mechanism is disposed within the housing. The locking mechanism is configured to retain the arm in the locked position by engaging the shaft and restricting its vertical translation.

The novel structure may include a fence that at least partially encloses a space where the motorcycle or the scooter is to be placed. A gate may be pivotally attached to the fence, wherein the gate is configured to open and close. When closed, the gate prevents the motorcycle or the scooter from being rolled out of the fenced enclosure.

The gate may be configured to open and close in response to rotation of the shaft.

The locking mechanism preferably includes a locking member, and the shaft has a plurality of notches. The notches are adapted to receive the locking member. When the locking member engages a notch on the shaft, the shaft is restrained from vertical movement, therefore retaining the securing arm in the locked position.

The locking mechanism may be configured to release the shaft in response to authenticating a user. Various means of authentication may be used, including a mechanical key, an infrared ray scanning, a radio frequency identification, an alphanumerical code, an electronic code, and combinations thereof.

In another embodiment, the housing has a shoulder with a slot, and the shaft has a protruding finger. The finger rests on the shoulder when the arm is in the unlocked position. The shoulder prevents downward movement of the shaft. The finger must be aligned with the slot to transition the arm from the unlocked position into the locked position. The shoulder may have a sloped surface. The sloped surface is configured to cause rotation of the shaft when the finger slides down the sloped surface.

The motorcycle stand may further include a damper disposed within the housing. The damper may function to reduce the rate of downward vertical translation of the shaft preventing it from slamming into the motorcycle potentially causing damage or injury.

Vertical translation of the shaft may be facilitated by a spring, a cable-pulley system, a hydraulic system, a gear system, an electric motor, or a combination thereof.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

Figure 1:
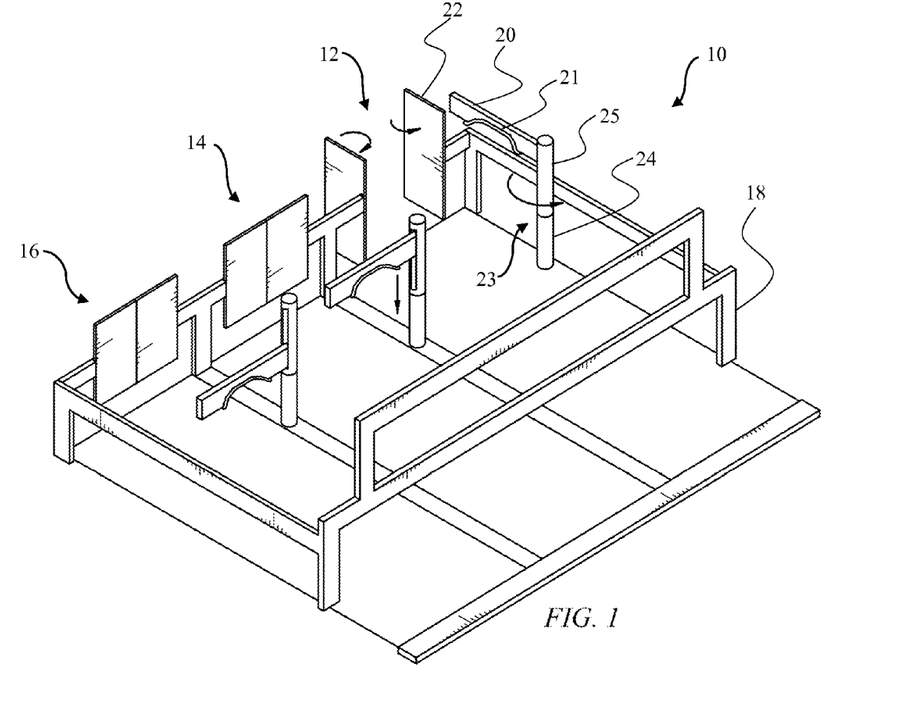
FIG. 1 is a perspective view of three motorcycle stands, each being in different configuration.

The novel motorcycle stand with locking mechanism according to the present invention is denoted as a whole in FIG. 1 by the reference numeral 10. Motorcycle stand 10 has three configurations: unlocked configuration 12, transitional configuration 14, and locked configuration 16.

Motorcycle stand 10 includes several measures for securing a parked motorcycle within the motorcycle stand 10. The primary locking mechanism is securing arm 20. The position of securing arm 20 is adjustable to accommodate almost every common motorcycle and motorized scooter. Securing arm 20 includes arch 21 adapted to surmount a seat of a motorcycle. Arch 21 secures the motorcycle in an upright position, therefore preventing a locked motorcycle from being tipped over and slid out from underneath securing arm 20. Securing arm 20 restrains the motorcycle in place preventing its forward, backward, or lateral movement, thus preventing theft of the motorcycle so long as securing arm 20 remains in place.

Fence 18 may surround the parking space to deter people from touching, kicking, knocking over, or otherwise vandalizing a parked motorcycle. Gate doors 22 may be used to provide an additional layer of security for the parked motorcycle by completing the enclosure formed by fence 18. In addition to deterring potential vandalism, fence 18 and gate doors 22 make unauthorized removal of the motorcycle less likely. Even if the motorcycle is removed from underneath securing arm 20, thieves will have limited amount of space to maneuver the motorcycle between securing arm 20, closed gate 22, and fence 18. Furthermore, to take the motorcycle out of the motorcycle stand 10, the motorcycle must be lifted over fence 18, which makes theft even more difficult.

Figure 2A:
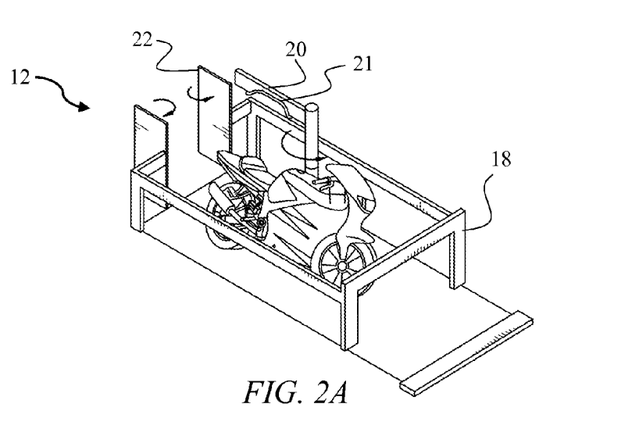
FIG. 2A is a perspective view of a motorcycle inside the motorcycle stand when the motorcycle stand is in an unlocked configuration.
Figure 2B:
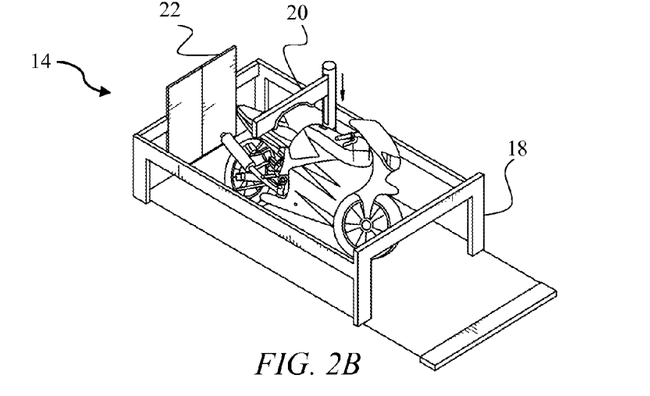
FIG. 2B is a perspective view of a motorcycle inside the motorcycle stand when the motorcycle stand is in a transitional configuration.
Figure 2C:
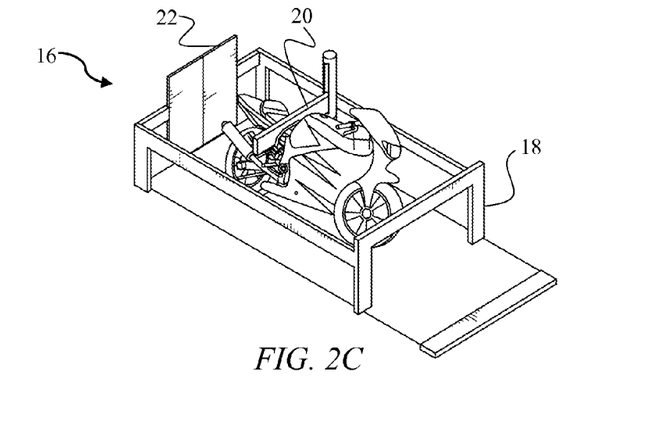
FIG. 2C is a perspective view of a motorcycle inside the motorcycle stand when the motorcycle stand is in a locked configuration.

FIGS. 2A-C depict a sequence of steps to lock the motorcycle within motorcycle stand 10. FIG. 2A depicts motorcycle stand 10 in its default unlocked configuration 12. A motorcyclist rolls the motorcycle into motorcycle stand 10 through gate doors 22, which are open when the stand is in its unlocked configuration 10. The inner space of motorcycle stand 10 is unobstructed by securing arm 20 which is rotated away from the inner space. The motorcycle is placed adjacent to securing arm housing 23. In some embodiments, housing 23 may include stationary lower housing 24 and upper housing 25. Upper housing 25 is in coaxial configuration with stationary lower housing 24, wherein upper housing 25 is rotational about its center axis while lower housing 24 remains stationary. Upper housing encloses shaft 26 of securing arm 20, preventing tampering and protecting housed components from the environment. In alternative embodiments, upper housing 25 may be absent, thereby exposing the upper portion of shaft 26.

FIG. 2B illustrates transitional configuration 14 of motorcycle stand 10. After the motorcycle is positioned adjacent to housing 23, securing arm 20 is rotated by about ninety degrees (90°) about a center axis of its shaft into a position where securing arm 20 is substantially perpendicular to the body of the motorcycle and arch 21 is directly above the seat. Gate doors 22 are configured to rotate by about 90° in response to rotation of securing arm 20, thus enclosing the space within fence 18. Rotation of securing arm 20 may be accomplished manually or through a use of an electric motor.

FIG. 2C shows motorcycle stand 10 in its locked configuration 16. After securing arm 20 is rotated into a position where arch 21 is positioned above the motorcycle seat, securing arm 20 is lowered until arch 21 surmounts the upper portion of the motorcycle. A locking mechanism fixates shaft 26 of securing arm 20 in this position, thus locking the motorcycle.

Figure 3A:
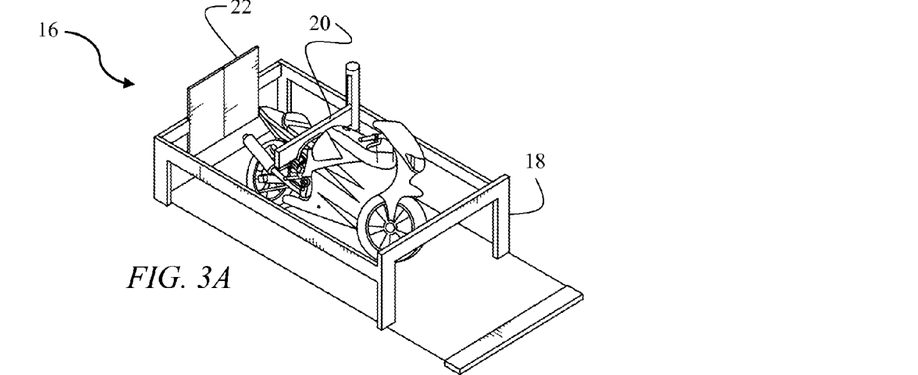
FIG. 3A is a perspective view of a motorcycle inside the motorcycle stand when the motorcycle stand is in a locked configuration.
Figure 3B:
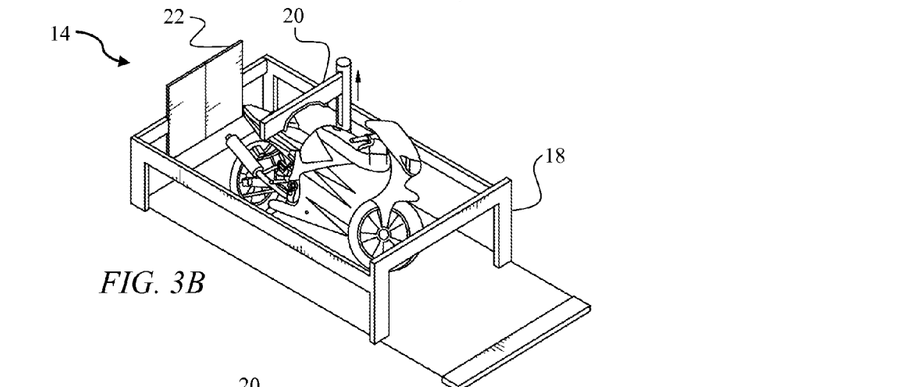
FIG. 3B is a perspective view of a motorcycle inside the motorcycle stand when the motorcycle stand is in a transitional configuration.
Figure 3C:
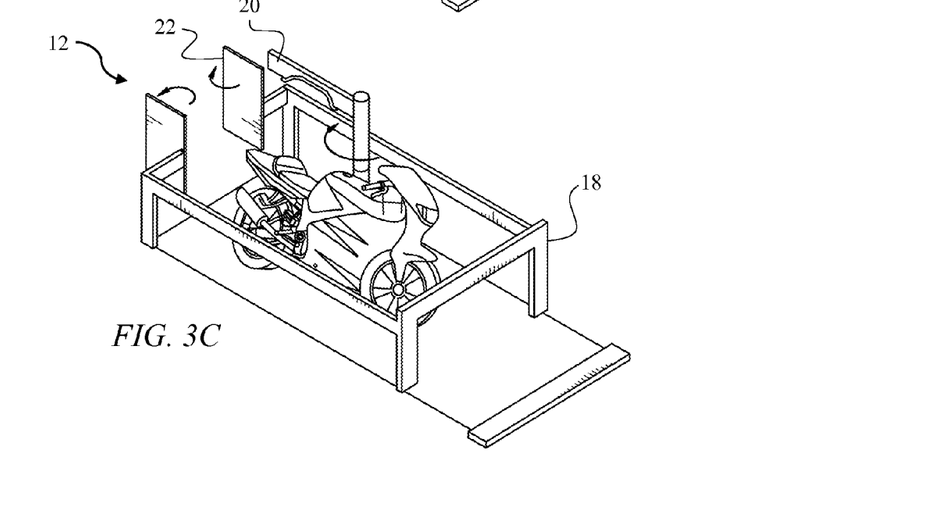
FIG. 3C is a perspective view of a motorcycle inside the motorcycle stand when the motorcycle stand is in an unlocked configuration.

FIGS. 3A-C illustrate a sequence of steps for unlocking a parked motorcycle. Initially, security stand 10 is in its locked configuration 16 as depicted in FIG. 3A. Upon presenting an appropriate key, which may be magnetic, mechanical, electronic (i.e. a numerical sequence), radio frequency identification (RFID), infrared ray scanning of an identification card, etc., the locking mechanism releases shaft 26 allowing the user to raise securing arm 20 to unlock the motorcycle. The step of raising securing arm 20 may be performed manually, through a mechanical biasing device (i.e. a compression spring), hydraulics, pneumatics, or an electric motor.

After securing arm 20 is raised away from the motorcycle, a transitional configuration 14 depicted in FIG. 3B is achieved. Gate doors 22 remain closed. Securing arm 20 is rotated by about 90° away from the motorcycle to transition motorcycle stand 10 into its unlocked configuration 12 depicted in FIG. 3C. Each gate door 22 is configured to rotate outwardly by about 90° in response to rotation of securing arm 20. After securing arm 20 is placed in its default unlocked position, the user reverses the motorcycle out of security stand 20. At this point, motorcycle stand 10 is in unlocked configuration 12 and is ready for subsequent uses.

Figure 4A:
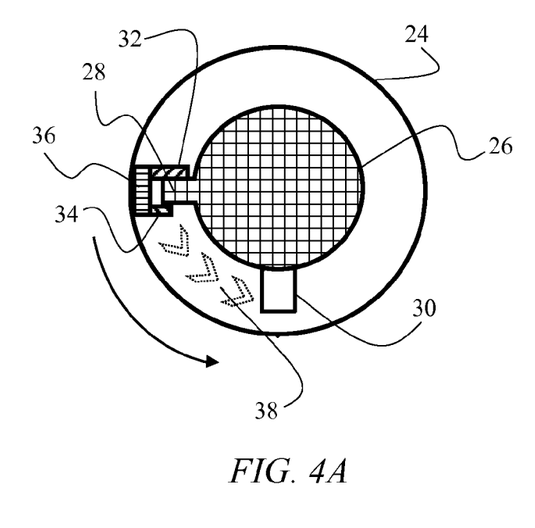
FIG. 4A is a top view of the shaft disposed within the housing when the securing arm is in an unlocked configuration.
Figure 4B:
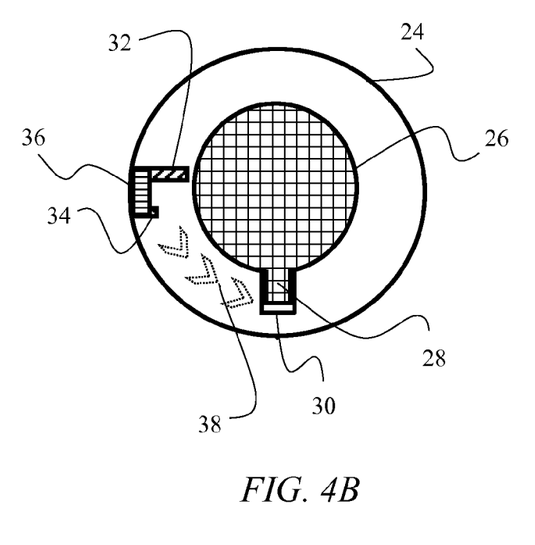
FIG. 4B is a top cross-sectional view of the shaft disposed within the housing when the securing arm is in transitional configuration.

FIGS. 4A-B illustrate transition of shaft 26 from unlocked configuration 12 to transitional configuration 14. Lower housing 24 includes a shoulder 27. Shoulder 27 contains slot 30 adapted to receive finger 28 protruding from shaft 26. Shaft 26 may be secured in its unlocked position by magnet 32 or retractable pin 34, or both. Magnet 32 and retractable pin 34 are in communication with control module 36, which activates and deactivates magnet 32 and retracts pin 34. Pin 34 may be biased toward finger 28. Shoulder 27 may include sloped surface 38. As depicted in FIG. 4A, sloped surface 38 may be configured to guide finger 28 toward slot 30. Sloped surface 38 causes shaft 26 to automatically initiate rotation upon release of finger 28 from magnet 32 and/or pin 34—gravity causes finger 28 to slide down sloped surface 38 once finger 28 is released. This feature makes the locking mechanism appear to be automated and facilitates ease of operation.

In the alternative, sloped surface 38 may be configured to guide finger 28 toward unlocked position 12. This eliminates the need for magnet 32 and pin 34 because gravity retains shaft 26 in unlocked position 12. However, a disadvantage of this configuration is that the user will be required to manually rotate securing arm 20 into transitional position 14.

Upon shaft 26 rotating by a predetermined angle (90° in the embodiment of FIGS. 4A-B), finger 28 aligns with slot 30 as shown in FIG. 4B. Once slot 30 and finger 28 are aligned, securing arm 20 may be lowered to achieve locked position 16 securing the parked motorcycle. When securing arm 20 is lowered, shaft 26 cannot rotate because slot 30 constrains finger 28 allowing only for vertical translation of shaft 26 along its center axis. Accordingly, until securing arm 20 is raised to a position where finger 28 exits slot 30, shaft 26 cannot rotate.

Figure 5:
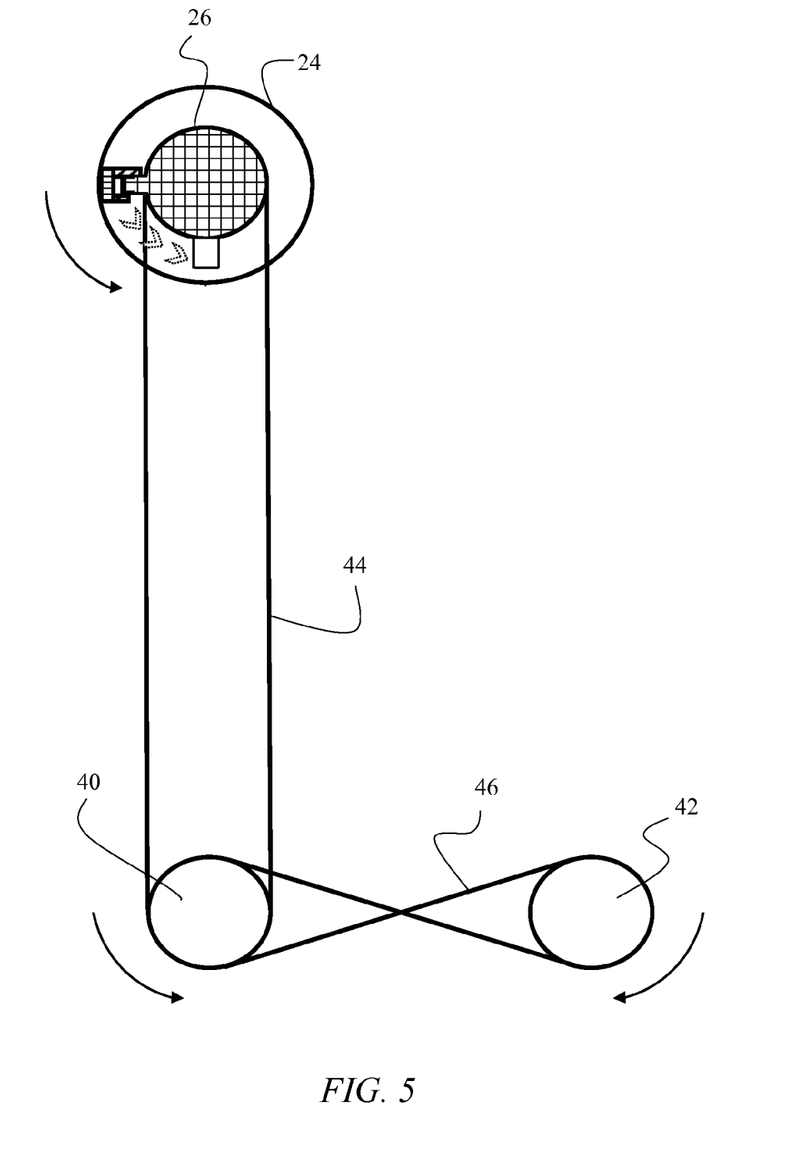
FIG. 5 is a top cross-sectional view schematically showing a chain-gear system interconnecting the shaft of the securing arm and gate doors.

FIG. 5 illustrates an embodiment of the invention involving gate doors 22. Rotation of shaft 26 and gate doors 22 may be synchronized via a mechanism depicted in FIG. 5. A gear and chain assembly may be used to achieve this functionality. Chain 44 is configured to translate rotational movement of shaft 26 to first shaft 40 of the first door. Chain 46 is configured to translate rotational movement in reverse direction to second shaft 42 of the second door. In this manner, both gate doors 22 rotate in sync with securing arm 20 eliminating the need to manually close and open gate doors 22. Furthermore, gate doors 22 cannot be opened when shaft 26 is in its locked position because first and second shafts 40 and 42 of gate doors 22 cannot rotate unless shaft 26 of securing arm 20 also rotates. This allows one locking mechanism to simultaneously lock both securing arm 20 and gate doors 22.

In alternative embodiments, the chain-gear system may be replaced by any means known in the art for rotationally driving a shaft including gear systems and cable-pulley systems. Moreover, one or more electric motors may be used to actuate gate doors 22. The electric motors may be actuated in response to an electrical signal triggered when a user locks or unlocks securing arm 20: For example, upon insertion of a key or entering a code, or simply in response to shaft 26 rotating.

Figure 6A:
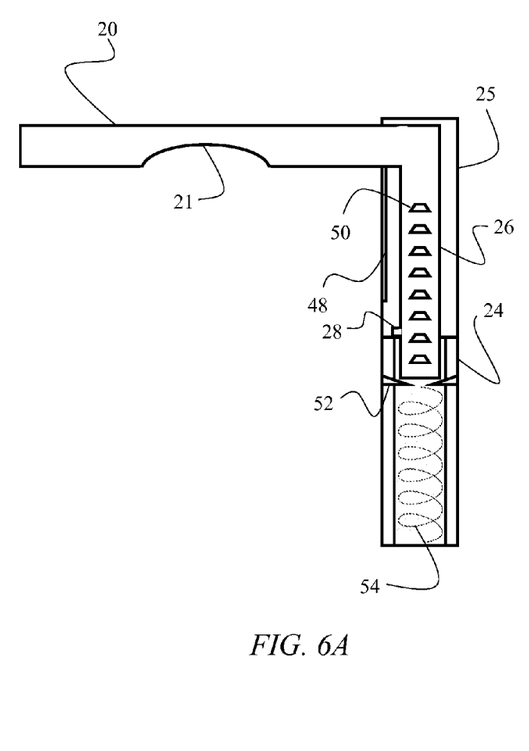
FIG. 6A is a front cross-sectional view depicting security arm in an unlocked configuration.
Figure 6B:
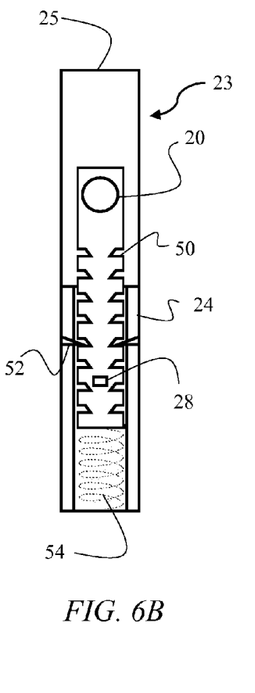
FIG. 6B is a front cross-sectional view depicting security arm in a locked configuration.

FIGS. 6A-B schematically illustrate operation of a novel locking mechanism. Upper housing 25 is rotational with respect to stationary lower housing 24. In unlocked configuration 12, finger 28 rests on shoulder 27 preventing shaft 26 from being lowered into lower housing 24. After shaft 26 is rotated into its transitional position depicted in FIG. 6B, finger 28 aligns with slot 30 within lower housing 24. In this position, shaft 26 may be moved downward along its central axis within lower housing 24, which functions as a sleeve. Upper housing 25 includes a longitudinal slot 48 allowing securing arm 20 to move in a vertical plane.

In some embodiments, spring 54 may be housed within lower base 24. Spring 54 functions as a damper preventing shaft 26 from dropping too rapidly once finger 28 aligns with slot 30. The stiffness of spring 54 may be such that a downward force must be applied to securing arm 20 to compress spring 54. This may be advantageous to prevent securing arm 20 from lowering on its own, potentially damaging the motorcycle or causing an injury. In some applications, the stiffness of spring 54 may allow securing arm 20 to lower onto the motorcycle but at a controlled rate because the force of the spring will exert a force on shaft 26 opposing its weight.

One or more locking members 52 are housed within lower housing 24 and are adapted to engage notches 50 on shaft 26, therefore securing shaft 26 in its lowered position. Locking members 52 may be bayonets biased toward shaft 26, upwardly biased tines that allow shaft 26 to move downward but not upward, or any other locking means known in the art. Once shaft 26 is lowered, locking members 52 engage notches 50 preventing shaft 26 from being raised, thus ensuring that securing arm 20 remains in locked position 16, where arch 21 surmounts the body of the motorcycle.

To unlock the motorcycle, locking members 52 must be retracted to disengage notches 50, therefore releasing shaft 26. Once shaft 26 is released, it may be raised to bring motorcycle stand 10 into transitional position 14. Spring 54 counteracts the weight of shaft 26 and securing arm 20 to ease the task of manual lifting. In some embodiments, a spring, an electric motor, hydraulics, a cable-pulley system, or other means of raising an object may be employed to assist the user with lifting securing arm 20. In some embodiments, locking members 52 may be in communication with control module 36, which causes locking members 52 to disengage upon receipt of an appropriate key.

A number of technologies are known in the art for securing locks against unauthorized access. For example, U.S. Pat. No. 5,373,146, which is incorporated herein by reference, discloses a card-based access system that utilizes infrared ray scanning to authenticate an identification code marked on a card. This technology may be employed in some embodiments of the invention. For example, for residential purposes, where each user is assigned a particular parking space, an issued access card may be used to unlock a specific spot assigned to the cardholder. In a commercial setting, a card or a token may be stored in a motorcycle stand and released to the user upon securing the motorcycle within the stand or receipt of a payment.

Another authentication technology that may be used to unlock the motorcycle stand is disclosed in U.S. Pat. No. 8,410,899, which is also incorporated herein by reference. A radio frequency identification tag (RFID) may be programmed to selectively unlock the motorcycle stand. The tag may either be issued to a specific user in the settings where the spot is assigned, or in alternative, the tag may be presented for each individual use of the motorcycle stand.

Yet another technology that may be used for authentication is disclosed in U.S. published patent application 2013/0043973, the contents of which are also incorporated by reference. An electronic lock system is programmable to unlock the device only upon entry of a correct numerical code. The code may be issued to the user, or the user may enter his own code, which is then reset after each use. In an alternative to the technologies discussed above, a simple mechanical key may be used to achieve the same purpose.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

GLOSSARY OF CLAIM TERMS

Arm—a member extending laterally from a vertical shaft.

Authentication means—a means of verifying that an individual attempting to unlock the stand possess a requisite code or key.

Damper—a mechanical device used to dissipate kinetic energy

Fence—a structure designed to restrict or prevent movement across a boundary.

Finger—a member that protrudes from a shaft to effect, direct, or restrain motion when brought into contact with another object.

Gate—a point of entry to a space enclosed by a fence.

Housing—a structure that protects and holds internal components.

Locked position—a position in which the arch of the securing arm surmounts the parked vehicle, and the shaft is restrained from vertical translation.

Locking mechanism—a mechanism configured to selectively restrain the shaft within the housing preventing vertical translation of the shaft.

Locking member—a member engaging the shaft to prevent its vertical translation.

Notch—indentation on the outer surface of the shaft adapted to receive a locking member.

Slot—an aperture adapted to receive the finger of the shaft.

Shaft—a cylindrical member which transmits rotational forces to the arm that extends therefrom.

Shoulder—a surface perpendicularly disposed within the housing preventing downward movement the shaft.

Sloped surface—a surface that is not parallel to a horizontal plane.

Unlocked position—a position in which the securing arm is retracted away from a motorcycle.

What is claimed is:

1. A stand for securing motorcycles and motorized scooters, comprising:
    a housing;
    a shaft rotationally disposed within the housing, the shaft configured to translate vertically along a longitudinal axis thereof;
    an arm extending from the shaft, the arm configured to transition between a locked and an unlocked positions, the arm having an arch adapted to surmount a body of a motorcycle or a scooter when the arm is in the locked position; and
    a locking mechanism disposed within the housing, the locking mechanism configured to retain the arm in the locked position by engaging the shaft and restricting vertical translation thereof;
    a fence at least partially enclosing a space where the motorcycle or the scooter is to be placed;
    a gate pivotally attached to the fence, the gate configured to open and close, whereby the gate prevents the motorcycle or the scooter from being rolled out from the at least partially enclosed space when the gate is closed; and
    the gate being configured to open and close in response to rotation of the shaft.

2. The stand according to claim 1, further comprising:
    the locking mechanism having a locking member; and
    the shaft having a plurality of notches, the notches adapted to receive the locking member, whereby the shaft is restrained from vertical movement when the locking member engages at least one of the notches.

3. The stand according to claim 1, further comprising:
    the locking mechanism being configured to release the shaft in response to authenticating a user, whereby an authentication means is selected from the group consisting of a mechanical key, an infrared ray scanning, a radio frequency identification, an alphanumerical code, an electronic code, and combinations thereof.

4. The stand according to claim 1, further comprising:
    the housing having a shoulder, the shoulder containing a slot; and
    a finger protruding from the shaft, the finger resting on the shoulder when the arm is in the unlocked position, whereby the finger must be aligned with the slot to transition the arm from the unlocked position into the locked position.

5. The stand according to claim 4, further comprising:
    the shoulder having a sloped surface, the sloped surface configured to facilitate rotation of the shaft by urging the finger to slide downward along the sloped surface.

6. The stand according to claim 1, further comprising:
    a damper disposed within the housing, the damper configured to reduce a rate of downward vertical translation of the shaft.

7. The stand according to claim 1, further comprising:
    a displacement mechanism for facilitating vertical translation of the shaft disposed within the housing.

8. The stand according to claim 7, further comprising:
    the displacement mechanism for facilitating vertical translation of the shaft being selected from the group consisting of a spring, a cable-pulley system, a hydraulic system, a pneumatic system, a gear system, an electric motor, and combinations thereof.

9. A stand for securing motorcycles and motorized scooters, comprising:
    a housing having a shoulder, the shoulder containing a slot;
    a shaft rotationally disposed within the housing, the shaft configured to translate vertically along a longitudinal axis thereof;
    an arm extending from the shaft, the arm configured to transition between a locked and an unlocked positions, the arm having an arch adapted to surmount a body of a motorcycle or a scooter when the arm is in the locked position;
    a finger protruding from the shaft, the finger resting on the shoulder when the arm is in the unlocked position, whereby the finger must be aligned with the slot to transition the arm from the unlocked position into the locked position; and
    a locking mechanism disposed within the housing, the locking mechanism configured to retain the arm in the locked position by engaging the shaft and restricting vertical translation thereof.

10. The stand according to claim 9, further comprising:
    a fence at least partially enclosing a space where the motorcycle or the scooter is to be placed; and
    a gate pivotally attached to the fence, the gate configured to open and close, whereby the gate prevents the motorcycle or the scooter from being rolled out from the at least partially enclosed space when the gate is closed.

11. The stand according to claim 10, further comprising:
    the gate being configured to open and close in response to rotation of the shaft.

12. The stand according to claim 9, further comprising:
    the locking mechanism having a locking member; and
    the shaft having a plurality of notches, the notches adapted to receive the locking member, whereby the shaft is restrained from vertical movement when the locking member engages at least one of the notches.

13. The stand according to claim 9, further comprising:
    the locking mechanism being configured to release the shaft in response to authenticating a user, whereby an authentication means is selected from the group consisting of a mechanical key, an infrared ray scanning, a radio frequency identification, an alphanumerical code, an electronic code, and combinations thereof.

14. The stand according to claim 9, further comprising:
    the shoulder having a sloped surface, the sloped surface configured to facilitate rotation of the shaft by urging the finger to slide downward along the sloped surface.

15. The stand according to claim 9, further comprising:
    a damper disposed within the housing, the damper configured to reduce a rate of downward vertical translation of the shaft.

16. The stand according to claim 9, further comprising:
    a displacement mechanism for facilitating vertical translation of the shaft disposed within the housing.

17. The stand according to claim 16, further comprising:
the displacement mechanism for facilitating vertical translation of the shaft being selected from the group consisting of a spring, a cable-pulley system, a hydraulic system, a pneumatic system, a gear system, an electric motor, and combinations thereof.

\* \* \* \* \*